United States Patent [19]
Kohara

[11] Patent Number: 5,036,935
[45] Date of Patent: Aug. 6, 1991

[54] TRAVEL CONTROL DEVICE FOR UNMANNED VEHICLE

[75] Inventor: Ikumitsu Kohara, Kariya, Japan

[73] Assignee: Kabushiki Kaisha Toyoda Jidoshokki Seisakusho, Kariya, Japan

[21] Appl. No.: 488,665

[22] Filed: Mar. 5, 1990

[30] Foreign Application Priority Data

Mar. 8, 1989 [JP] Japan ............... 1-56763

[51] Int. Cl.$^5$ ................. B60T 7/12; B62D 1/28
[52] U.S. Cl. ............................ 180/168; 180/279; 318/587; 364/424.02; 364/426.01
[58] Field of Search ............ 180/167, 168, 169, 170, 180/275, 277, 279, 131; 318/587; 340/438, 439, 459, 936; 364/424.01, 424.02, 426.01, 426.04; 293/4

[56] References Cited

U.S. PATENT DOCUMENTS

| | | | |
|---|---|---|---|
| 3,817,344 | 6/1974 | Asano et al. | 180/168 |
| 4,042,058 | 8/1977 | Cooper | 180/168 |
| 4,108,269 | 8/1978 | Nakao | 180/168 |
| 4,284,160 | 8/1981 | Deliban et al. | 180/168 |
| 4,546,840 | 10/1985 | Yukishige et al. | 180/279 X |
| 4,847,774 | 7/1989 | Tomikawa et al. | 180/167 X |
| 4,918,362 | 4/1990 | Christensen et al. | 180/168 X |

FOREIGN PATENT DOCUMENTS

2700580 7/1978 Fed. Rep. of Germany ............... 364/424.02
56-48335 11/1981 Japan.
61-265606 11/1986 Japan.
62-58312 3/1987 Japan.
0314614 12/1988 Japan ............... 364/424.02

Primary Examiner—Andres Kashnikow
Assistant Examiner—Brian L. Johnson
Attorney, Agent, or Firm—Brooks Haidt Haffner & Delahunty

[57] ABSTRACT

A travel control device for an unmanned vehicle automatically travelling along a predetermined travel path. The travel control device comprises non-contact type and contact type obstacle sensors for detecting an obstacle in front of the unmanned vehicle, and the unmanned vehicle is stopped when an obstacle is detected. A working area is predetermined along the travel path, and entrance and exit marks are provided to indicate the working area. When the unmanned vehicle enters the working area, a detection of signals output by the non-contact type obstacle sensor is disabled, to avoid unnecessary stops in the specific area and maintain a smooth travel of the unmanned vehicle. Further, a time counter is provided for counting a time from when the unmanned vehicle is stopped to a time when the unmanned vehicle is restarted, and when the unmanned vehicle is restarted, the unmanned vehicle is caused to travel at a speed higher than a previous speed at which it was travelling before being stopped, to recover a delay time incurred by the stop.

21 Claims, 7 Drawing Sheets

TRAVEL CONTROL DEVICE FOR UNMANNED VEHICLE

BACKGROUND OF THE INVENTION

1. Field of the Invention

The present invention relates to an unmanned vehicle used, for example, in an unmanned conveying system. In particular, it relates to a travel control device for an unmanned vehicle.

2. Description of the Related Art

Figure 8:
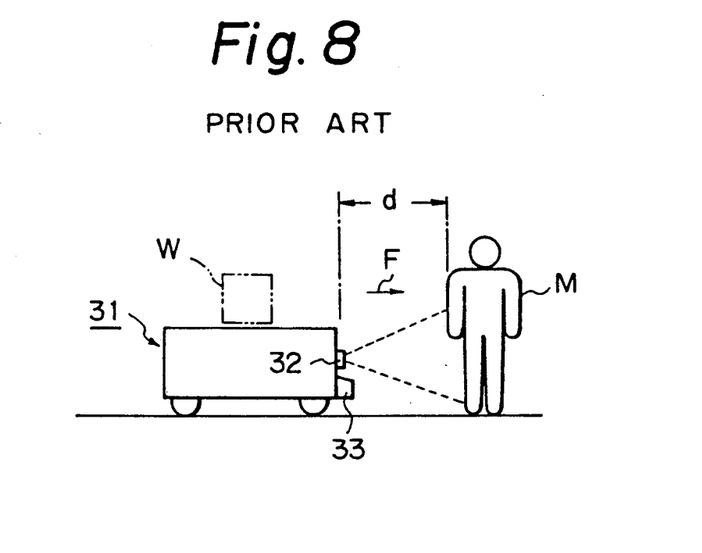
FIGS. 8 and 9 are side views of a conventional unmanned vehicle.
Figure 9:
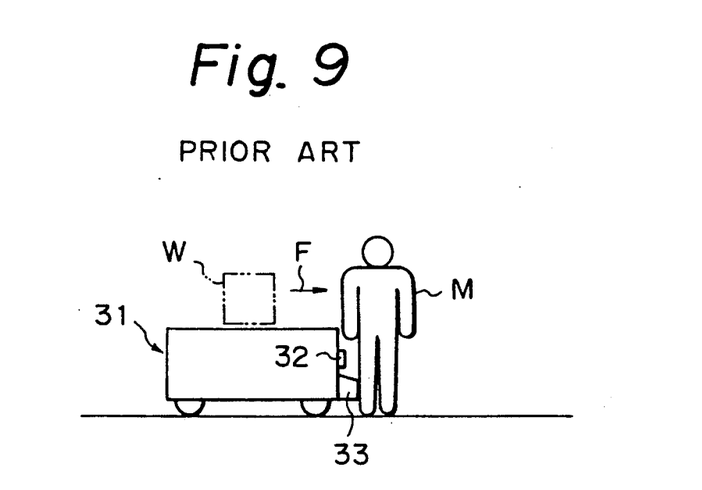

Unmanned vehicles are used in unmanned conveying systems in, for example, factories and warehouses. Most such unmanned vehicles are now electronically controlled and automatically travel at a constant speed along a predetermined path, and because the vehicle has no driver or attendant, an emergency stop means is incorporated in these unmanned vehicles. A typical emergency stop means is illustrated in FIGS. 8 and 9 of the attached drawings, wherein an unmanned vehicle 31 automatically travels along a predetermined travel path in the direction of the arrow F, and a known travel control device therefor includes a non-contact type obstacle sensor 32 (for example, an ultrasonic sensor) and a contact type obstacle sensor 33 (for example, a bumper sensor) arranged at the front of the vehicle, respectively, to stop the unmanned vehicle 31 in response to a detection signal output by the sensors 32 and 33.

The non-contact type obstacle sensor 32 detects an obstacle M (for example, a person) at a certain distance "d" (for example, 1 meter) from the unmanned vehicle 31, an emergency stop of the unmanned vehicle 31 is carried out as soon as the obstacle M is detected, and the unmanned vehicle 31 is automatically restarted when the output of the obstacle detection signal ceases. Also, the contact type obstacle sensor 33 detects an obstacle M upon a contact thereof with the contact type obstacle sensor 33, an emergency stop of the unmanned vehicle 31 is carried out, and the unmanned vehicle 31 is restarted when the output of the obstacle detection signal ceases and a manual start switch (not shown) is operated. In this manner, a safe movement of the unmanned vehicle 31 during travel is ensured by the emergency stop procedure based on a detection of signals output by the non-contact type and contact type obstacle sensors 32 and 33.

Nevertheless, a problem arises with unmanned vehicle 31 controlled by such a known travel control device when such a vehicle is part of a conveying system of an assembly line in a machine manufacturing factory. Namely, in an assembly line in a machine manufacturing factory, operators frequently approach and move around the unmanned vehicle 31, to unload a workpiece W carried by the unmanned vehicle or to attach parts to a workpiece W on the unmanned vehicle 31, and thus frequent emergency stops of the unmanned vehicle 31 are made, based on the detection of signals output by the non-contact type and contact type obstacle sensors 32 and 33.

In particular, detections by the non-contact type obstacle sensor 32 frequently cause the unmanned vehicle 31 to stop, and these frequent stops of the unmanned vehicle 31 have an adverse affect on sequential operations such as assembly work at an assembly line. Further, when a plurality of such unmanned vehicles 31 move together at predetermined intervals, frequent stops of the unmanned vehicle 31 cause irregular intervals to appear between the sequentially travelling unmanned vehicles 31, and thus problems arise in a conveying system in which articles are required to be conveyed at constant intervals.

SUMMARY OF THE INVENTION

An object of the present invention is to solve the above-described problems and to provide a travel control device or system for an unmanned vehicle which inhibits a stopping of an unmanned vehicle due to the detection of a signal output by the non-contact type obstacle sensor in a specific area, to ensure a smooth travel of the unmanned vehicle.

A further object of the present invention is to provide a travel control device for an unmanned vehicle which can recover a delay occurring when the unmanned vehicle is stopped by the detection of signals output by an obstacle sensor.

According to the first aspect of the present invention, there is provided a travel control device for an unmanned vehicle provided with steering means and driving means to enable the unmanned vehicle to automatically travel along a predetermined travel path, the travel control device comprising: guide means provided through the travel path and cooperating with the steering means to guide the unmanned vehicle along the travel path; at least one non-contact type obstacle sensor and at least one contact type obstacle sensor arranged on the unmanned vehicle for detecting an obstacle in front of the unmanned vehicle while travelling along the travel path, respectively; first control means for controlling the driving means to cause the unmanned vehicle to be stopped when an obstacle is detected by at least one of the non-contact type and contact type obstacle sensors; area indicating means arranged in the travel path for indicating a predetermined working area along the travel path; area detecting means arranged in the unmanned vehicle for detecting signals output by the area indicating means while the unmanned vehicle is travelling along the travel path, to determine whether the unmanned vehicle has entered the predetermined working area; second control means responsive to signals output by the area detecting means for controlling a detection of signals output by the non-contact type and contact type obstacle sensors so that signals output by the non-contact type obstacle sensor are ignored when the unmanned vehicle is travelling in the predetermined working area and a detection of signals output by both the non-contact type obstacle sensor and the contact type obstacle sensor is carried out when the unmanned vehicle is not travelling in the predetermined working area. By this arrangement, a detection of a stop signal for the unmanned vehicle output by the non-contact type obstacle sensor is ignored in the predetermined working area.

According to the second aspect of the present invention, there is provided a travel control device for an unmanned vehicle provided with steering means and driving means to enable the unmanned vehicle to automatically travel along a predetermined travel path, the travel control device comprising: guide means provided through the travel path and cooperating with the steering means to guide the unmanned vehicle along the travel path; at least one obstacle sensor arranged on the unmanned vehicle for detecting an obstacle in front of the unmanned vehicle travelling along the travel path; control means for controlling the driving means to cause the unmanned vehicle to stop when an obstacle is detected by at least one of the obstacle sensors and to thereafter restart the unmanned vehicle; time counting means for counting a time from a point at which the unmanned vehicle is stopped to a point at which the unmanned vehicle is restarted; said control means including a speed control means for causing the unmanned vehicle to travel at a speed higher than a previous speed at which the unmanned vehicle was travelling before being stopped, to recover a time delay occurring due to the stopping of the unmanned vehicle and counted by the time counting means, when the unmanned vehicle is restarted, whereby the travelling position of the unmanned vehicle is corrected to a predetermined desired position along the travel path.

BRIEF DESCRIPTION OF THE DRAWINGS

The present invention will become more apparent from the following description of the preferred embodiment with reference to the accompanying drawings; in which.

DESCRIPTION OF THE PREFERRED EMBODIMENT

The present invention is described in greater detail with reference to an embodiment of an unmanned conveying system in a machine manufacturing factory.

Figure 1:
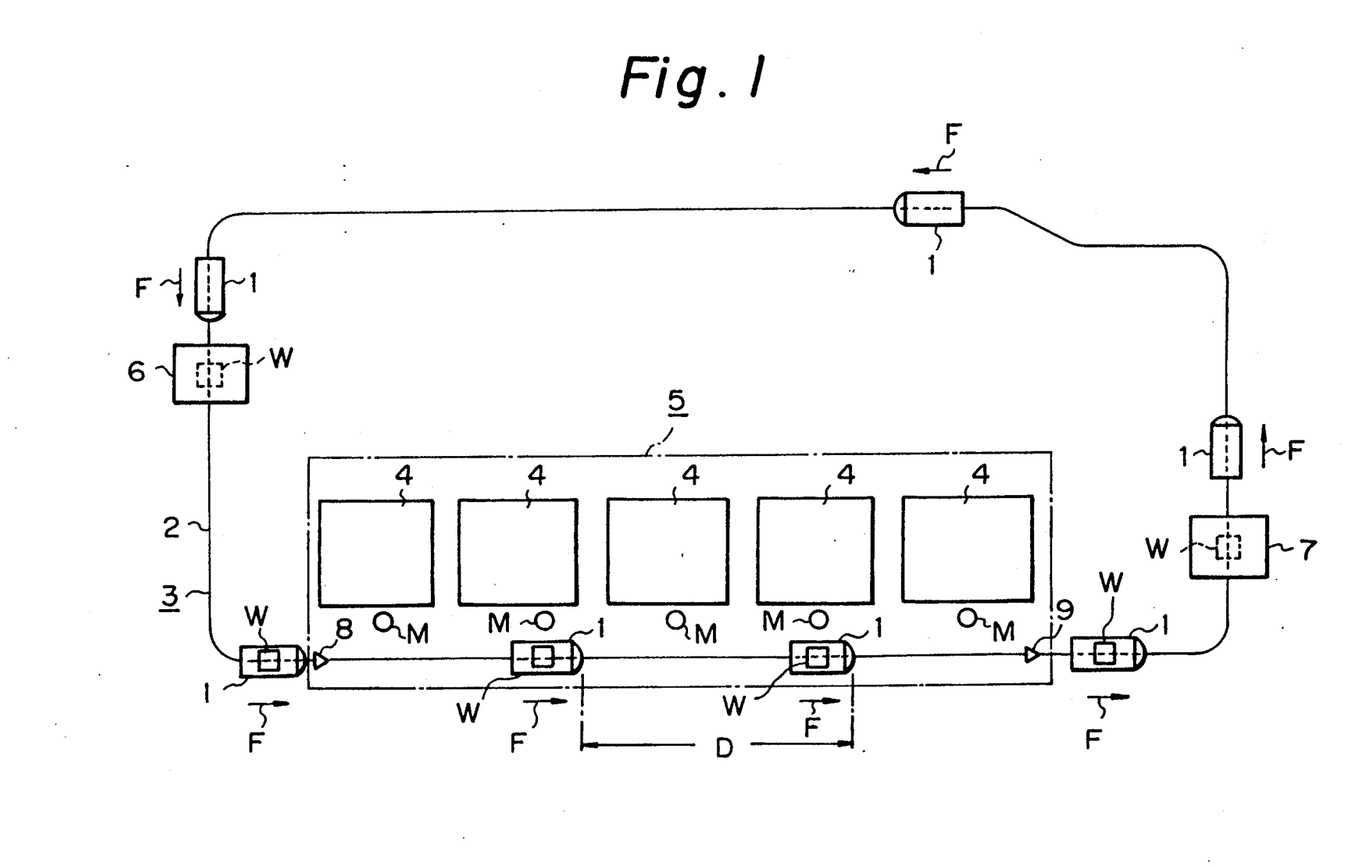
FIG. 1 is a diagrammatic plan view of an unmanned conveying system having a plurality of unmanned vehicles incorporated therein, according to the present invention.

FIG. 1 shows an unmanned conveying system having a plurality of unmanned vehicles 1. As shown in the Figure, a guide wire 2 through which a low frequency alternating current can be supplied is laid in the floor of the factory, to constitute a predetermined travel path 3. The travel path 3 extends in a rectangular closed loop, and a predetermined working or assembly area 5 including a plurality of assembly stations 4 is located at one long side of the rectangular travel path 3; the assembly area 5 constituting a specific area in the present invention. Parts of a machine are prepared in a predetermined order at the assembly stations 4, and operators M are assigned to each of the assembly stations 4. As shown in the Figure, the unmanned vehicles 1 travel in the direction of the arrow F, i.e., counterclockwise, and accordingly, a loading station 6 is located upstream of the assembly area 5 along the travel path 3, at which a workpiece W is loaded onto each of the unmanned vehicles 1 so that parts can be assembled to the workpiece W at the assembly area 5. Further, an unloading station 7 is located downstream of the assembly area 5 along the travel path 3, at which the workpiece W to which parts have been assembled is unloaded from each of the unmanned vehicles 1.

An entrance mark 8 is provided along the travel path 3 at the entrance to the assembly area 5, to indicate that the unmanned vehicle 1 is entering the assembly area 5, and an exit mark 9 is provided along the travel path 3 at the exit from the assembly area 5 to indicate that the unmanned vehicle 1 is leaving the assembly area 5. The entrance mark 8 and the exit mark 9 constitute an area indicating means indicating the assembly area 5 as a specific area.

Figure 5:
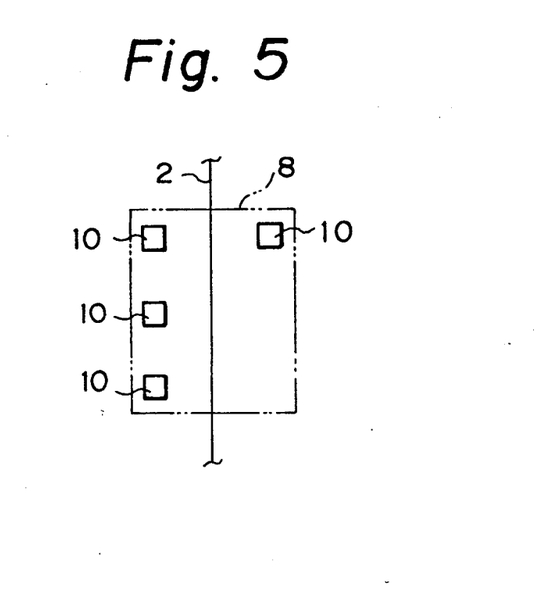
FIG. 5 is a plan view of the entrance mark indicating one end of the specific area.
Figure 6:
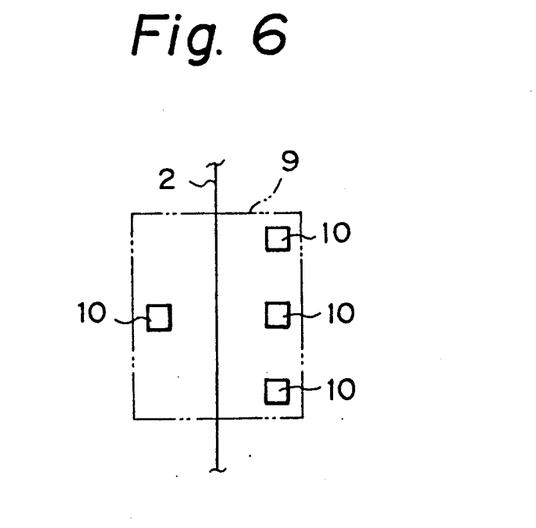
FIG. 6 is a plan view of the exit mark indicating the other end of the specific area.

As shown in FIGS. 5 and 6, each of the entrance mark 8 and the exit mark 9 is formed from a plurality of mark components, i.e., a plurality (four in the embodiment) of steel plate pieces 10 arranged in a predetermined pattern. The entrance mark 8 and the exit mark 9 have different patterns, i.e., the steel plate pieces 10 of the entrance mark 8 and the exit mark 9 are arranged on either side of the guide wire 2 and a different number of steel plate pieces 10 are arranged at the respective side of the entrance mark 8 and the exit mark 9.

Figure 2:
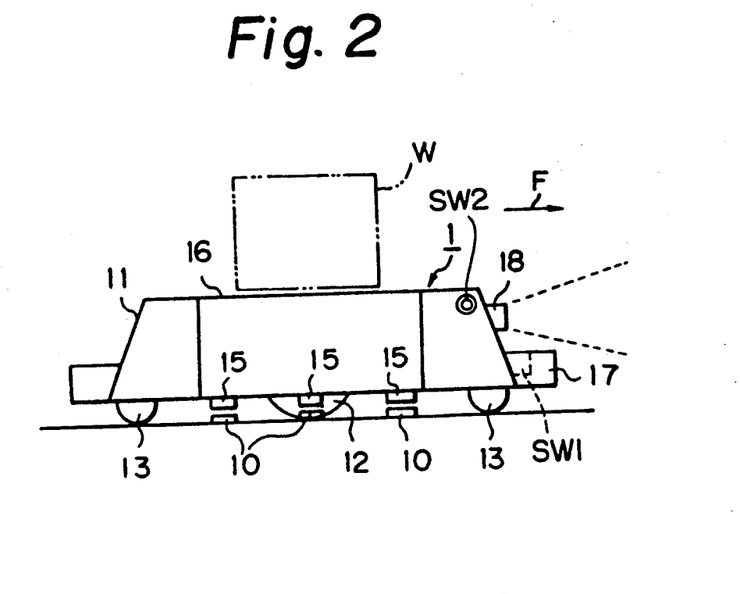
FIG. 2 is a side elevational view of the unmanned vehicle on the travel path at the specific area of FIG. 1, on an enlarged scale.
Figure 3:
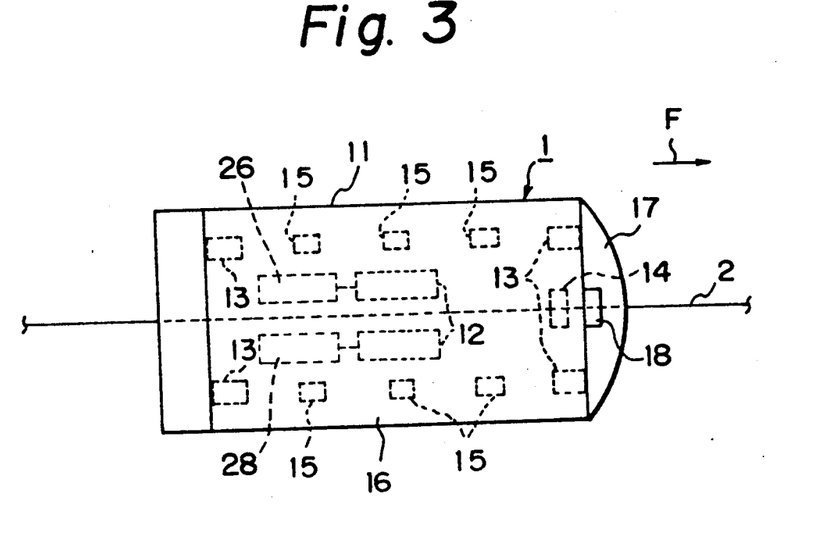
FIG. 3 is a plan view of the unmanned vehicle on the travel path of FIG. 2.

The unmanned vehicle 1 is able to travel automatically along the travel path 3, and thus is provided with a steering means including a means cooperating with the guide wire 2 to correct a transverse deviation of the unmanned vehicle 1 from the guide wire 2 by detecting the relative position therebetween, and a driving means for moving the unmanned vehicle 1 along the travel path 3. In the illustrated embodiment, as shown in FIGS. 2 and 3, the unmanned vehicle 1 comprises a body 11 and a pair of right and left steerable driving wheels 12 on the body 11 on either side of a central portion of the bottom thereof and on an axis perpendicular to a longitudinal axis of the unmanned vehicle 1, these steering driving wheels 12 constituting both the steering means and the driving means. Also, auxiliary wheels 13 are arranged on the body 11 at the front and rear and at either side of the bottom thereof, respectively.

A sensor with a pickup coil 14 is arranged on the body 11 at the front central portion of the bottom thereof, the pickup coil 14 being sensitive to a weak low frequency alternating current and thus able to detect the guide wire 2. Also, a plurality (six in the embodiment) of mark sensors 15 acting as area detecting means are arranged on the body 11 at the bottom thereof; these mark sensors 15 comprising proximity sensors and constituting an area detecting means able to read the patterns of the steel plate pieces 10 of the entrance mark 8 and the exit mark 9. In particular, the mark sensors 15 are located at a distance between adjacent mark sensors 15 identical to that between the steel plate pieces 10 of the entrance mark 8 and the exit mark 9, and in a resultant composite formation of overlapped, i.e., superimposed patterns of the steel plate pieces 10 of the entrance mark 8 and the exit mark 9, whereby the mark sensors 15 can be oppositely positioned above the entrance mark 8 and the exit mark 9, respectively, to read the patterns thereof, i.e., to detect the entry of the unmanned vehicle 1 to, and the departure thereof from, the assembly area 5.

The body 11 of the unmanned vehicle 1 is provided with a workpiece support holder 16 at an upper surface thereof, to support a workpiece W.

Figure 4:
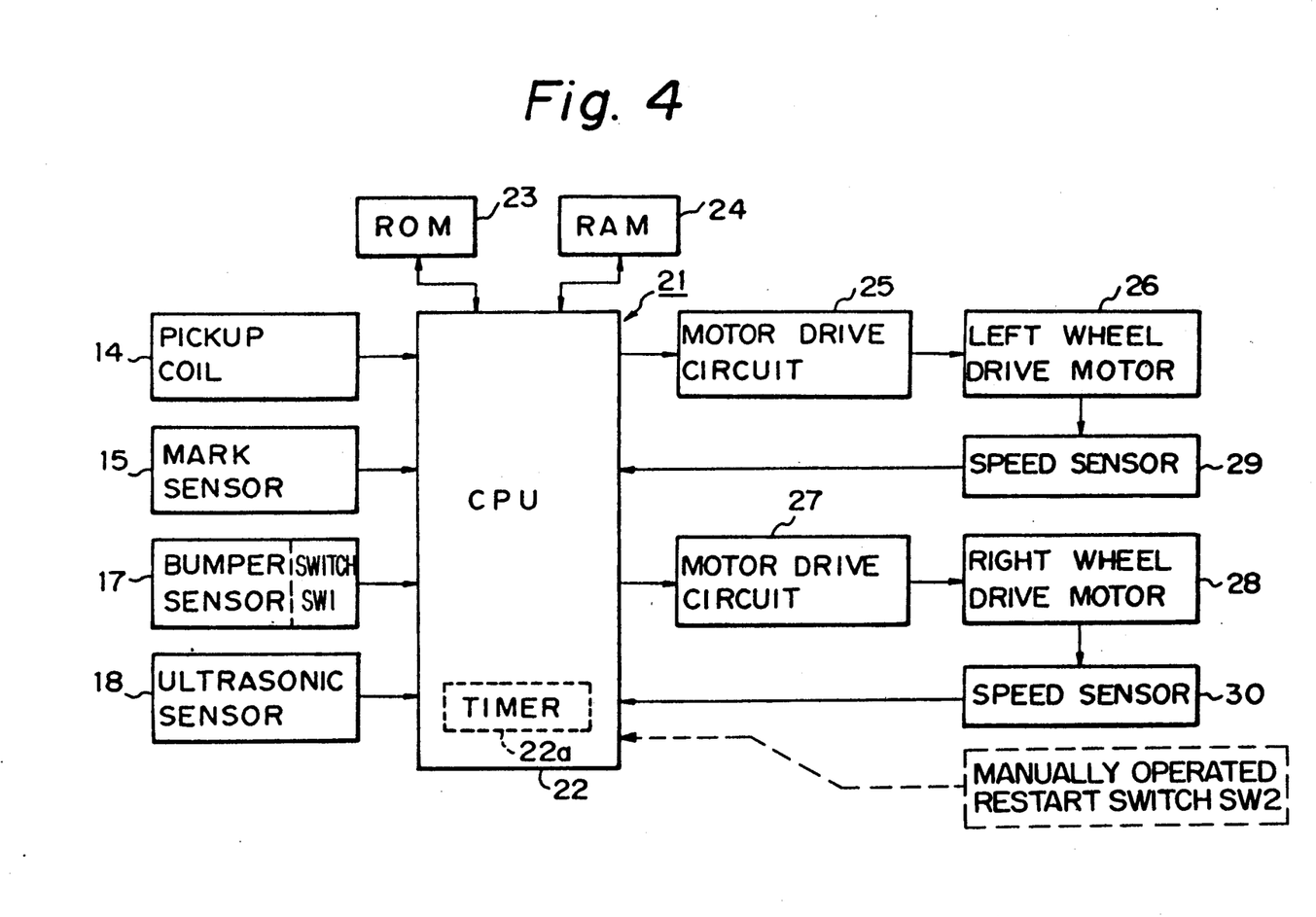
FIG. 4 is a block diagram of the travel control device for the unmanned vehicle of FIG. 1.

Also, in the illustrated embodiment, a bumper sensor 17 is arranged at the front of the unmanned vehicle 1 for detecting an obstacle such as an operator M by a contact between the obstacle and the bumper sensor 17. The bumper sensor 17 is a contact type obstacle sensor and comprises, in this embodiment, a movable bumper forming a movable part of a switch or able to actuate a switch SW1 (FIGS. 2 and 4). The unmanned vehicle 1 is subjected to an emergency stop when the bumper sensor 17 comes into contact with an obstacle such as an operator M.

Also, an ultrasonic sensor 18 acting as a non-contact type obstacle sensor is arranged on the unmanned vehicle 1. The ultrasonic sensor 18 can detect an obstacle such as an operator M at a certain distance from the unmanned vehicle 1, and an emergency stop of the unmanned vehicle 1 is carried out when an obstacle such as an operator M is detected by the ultrasonic sensor 18.

Also, in the illustrated embodiment, the unmanned vehicle 1 is controlled to travel at a first speed when outside the assembly area 5 and at a second lower speed (for example, 0.75 to 1.75 meters per minute lower than the first speed when inside the assembly area 5) to facilitate the assembly work in the assembly area 5 by the operators. Also, the leading and following unmanned vehicles 1 are controlled to travel at a constant distance D therebetween when in the assembly area 5.

The travel control device for the unmanned vehicle 1 according to the present invention is comprised of the above-described various means, and further includes the control means shown in the block diagram of FIG. 4. As shown in the Figure, a microcomputer 21 having control functions comprises a central processing unit (CPU) 22 and is provided with a timer 22a to count an elapse of time. The microcomputer 21 also comprises a read only memory (ROM) 23 for storing a control program and a random access memory (RAM) 24 for temporarily storing data processed by the CPU 22; the travel control being carried out in accordance with the control program stored in the ROM 23.

The signals output by the above described sensors, such as the pickup coil 14, the mark sensors 15, the bumper sensor 17, and the ultrasonic sensor 18 are input to the microcomputer 21. Note, separate motor drive circuits 25 and 27 are connected to a left wheel drive motor 26 and a right wheel drive motor 28, respectively, in FIG. 4, and these electric direct current motors 26 and 28 are connected to opposite steering driving wheels 12, respectively, for independently driving the steering driving wheels 12 to effect steering and driving. Speed sensors 29 and 30 are provided for detecting the speed of the motors 26 and 28, respectively.

The CPU 22 outputs a speed control signal to the motor drive circuit 25 in accordance with the predetermined control program, to control the direction of revolution and the rotational speed of the left wheel drive motor 26 driving the left steering driving wheel 12, and outputs a speed control signal to the motor drive circuit 27 to control the direction of revolution and the rotational speed of the right wheel drive motor 28 driving the right steering driving wheel 12. The CPU 22 carries out this control by calculating desired values of the direction of revolution and the rotational speed of the drive motors 26 and 28 from signals input by the speed sensors 29 and 30.

In particular, the CPU 22 controls the drive motors 26 and 28 based on the signals output by the pickup coil 14, to steer the unmanned vehicle 1 along the guide wire 2. If the unmanned vehicle 1 is traveling along the travel path 3 while outside the assembly area 5, the CPU 22 controls the drive motors 26 and 28 to stop the unmanned vehicle 1 upon receiving an emergency signal from at least one of the bumper sensor 17 and the ultrasonic sensor 18. When the output of such an emergency signal from at least one of the bumper sensor 17 and the ultrasonic sensor 18 ceases, the CPU 22 causes the drive motors 26 and 28 to restart, to thereby immediately restart the unmanned vehicle 1 and again commences the above-described steering control.

It is also possible to provide a manually operated restart switch (not shown) on the body 11 of the unmanned vehicle 1. An operator M may purposely touch the bumper sensor 17 to stop the unmanned vehicle 1, for example, in accordance with a progress of assembly work, or upon a further emergency situation and thereafter may push the restart switch to restart the unmanned vehicle 1. In this case, the CPU 22 thus causes the drive motors 26 and 28 to restart in response to a restart signal from the restart switch after an output of an obstacle detection signal from the bumper sensor 17 ceases.

Further, the CPU 22 receives signals output by the mark sensors 15 and determines whether or not the mark sensors 15 are above the entrance mark 8 or the exit mark 9. When the CPU 22 determines from the signals received from the mark sensors 15 that the mark sensors 15 are above the entrance mark 8, i.e., that the unmanned vehicle 1 is entering the assembly area 5, the CPU 22 outputs a control signal to cause the unmanned vehicle 1 to travel at a predetermined slower speed while in the assembly area 5, and simultaneously, disables the detection of signals output by the ultrasonic sensor 18 and maintains only the detection of signals output by the bumper sensor 17.

Thus the unmanned vehicle 1 does not stop even if an obstacle intercepts a possible range of detection of the ultrasonic sensor 18 in the assembly area 5 but does stop if the bumper sensor 17 comes into contact with an obstacle. If the unmanned vehicle 1 is stopped in the assembly area 5 by an emergency stop signal output by the bumper sensor 17, the timer 22a counts time elapsing during the stop of the unmanned vehicle 1, and this time count continues until the unmanned vehicle 1 is restarted. The CPU 22 controls the unmanned vehicle 1 based on the result of the time count, so that it travels at a speed higher than that at which the unmanned vehicle 1 usually travels while in the assembly area 5, to recover a delay incurred due to the stopping of the unmanned vehicle 1.

When the CPU 22 determines from signals output by the mark sensors 15 that the mark sensors 15 are above the outlet mark 9, i.e., that the unmanned vehicle 1 is leaving the assembly area 5, the CPU 22 outputs a control signal to cancel the slow speed travel control and cause the unmanned vehicle 1 to travel at the usual speed while outside the assembly area 5, and simultaneously, enables the detection signals output by the ultrasonic sensor 18. Thereafter, the CPU 22 controls the drive motors 26 and 28 to stop the unmanned vehicle 1 upon receiving an emergency signal from at least one of the bumper sensor 17 and the ultrasonic sensor 18.

During the operation of the conveying system, a workpiece W is loaded on the unmanned vehicle 1 at the loading station 6, and the unmanned vehicle 1 automatically travels along the travel path 3 and enters the assembly area 5, passing through the entrance mark 8. The unmanned vehicle 1 travels at a predetermined slow speed while in the assembly area 5 and passes by each of the assembly stations 4. While the unmanned vehicle is travelling at this slow speed, each operator M attaches parts to the workpiece W on the unmanned vehicle 1, in a predetermined sequence.

Then the unmanned vehicle 1 carrying the workpiece W with parts attached thereto leaves the assembly area 5, passing through the exit mark 9, automatically travels along the travel path 3 to the unloading station 7, where the workpiece W is unloaded, and then automatically travels to the loading station 6 to load a new workpiece W.

Figures 7, 7A:
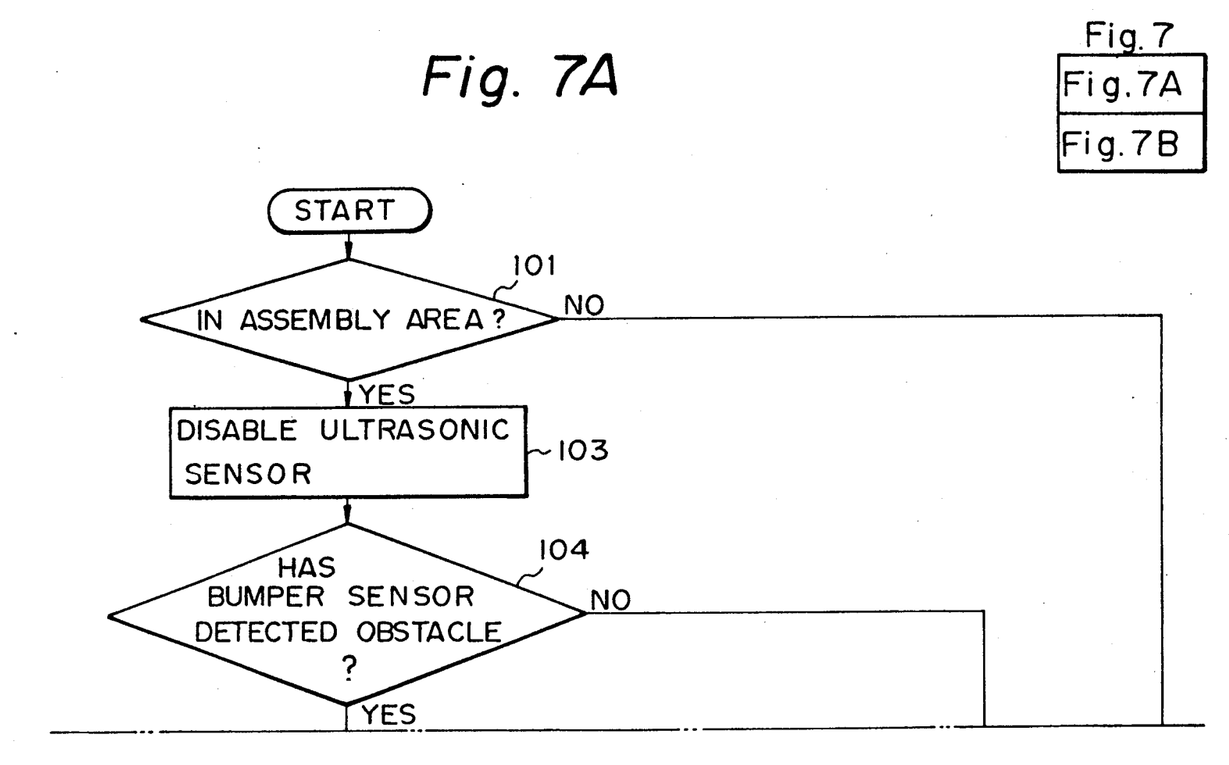
FIG. 7 is a graphic representation of the relationship between FIGS. 7A and 7B.
FIGS. 7A and 7B is a flow chart of the process steps for controlling of the unmanned vehicle based on signals output by the bumper sensor and the ultrasonic sensor in the specific area.
Figure 7B:
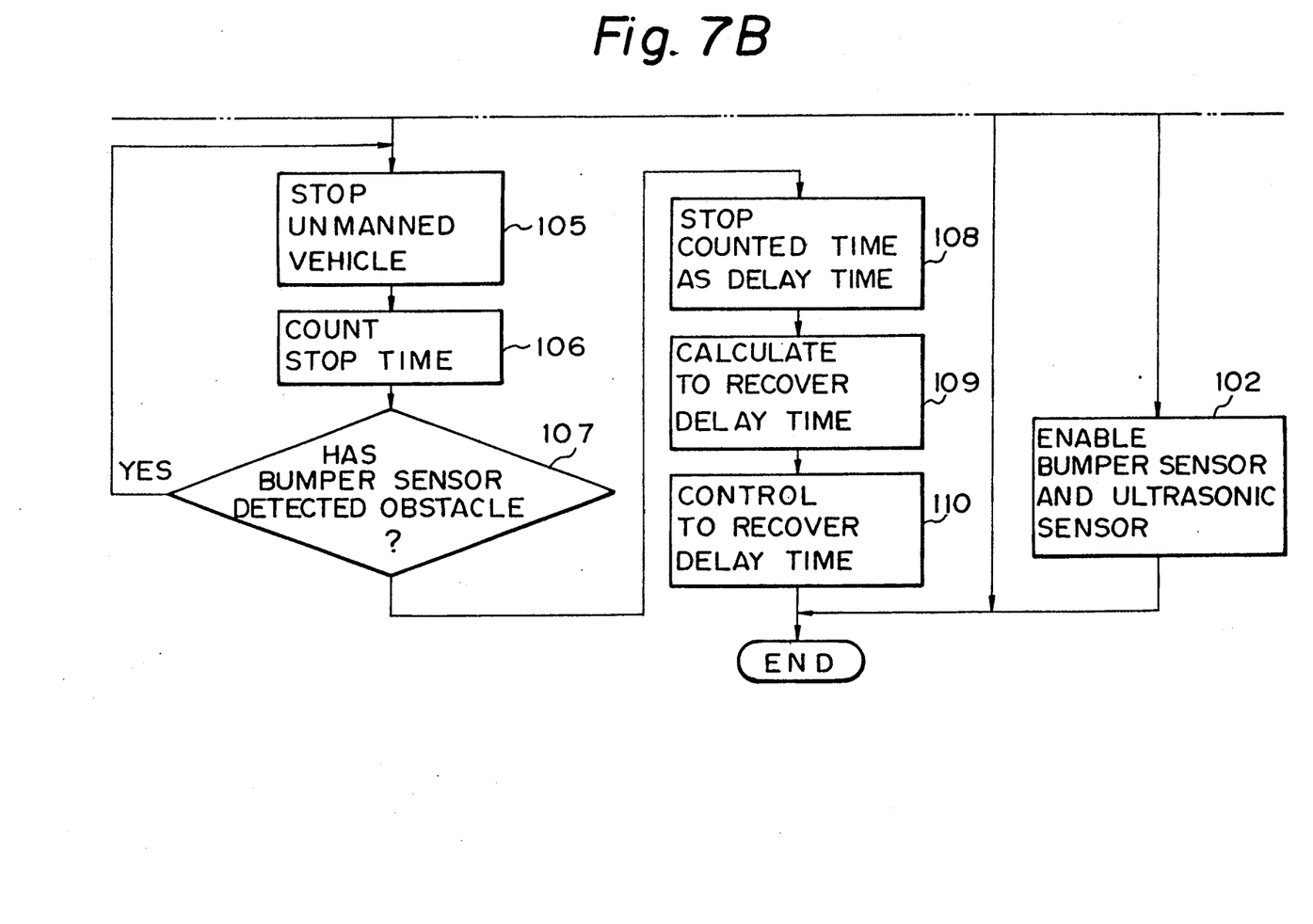

FIG. 7 is a flow chart showing the process of controlling the unmanned vehicle 1, based on signals output by the bumper sensor 17 and the ultrasonic sensor 18 in the assembly area 5. At step 101, the CPU 22 determines whether or not the unmanned vehicle 1 is in the assembly area 5. The result is NO if the unmanned vehicle 1 has left OR is leaving the assembly area 5 and is passing or has passed through the exit mark 9, and the result is YES when the vehicle has entered or is entering the assembly area 5 and is passing or has passed through the entrance mark 8.

When the exit mark 9 is detected but the entrance mark is not detected, the program proceeds to step 102 and the CPU 22 enables the detection of signals from both the bumper sensor 17 and the ultrasonic sensor 18. Namely, the CPU 22 controls the drive motors 26 and 28 to stop the unmanned vehicle 1 upon receiving an emergency signal from at least one of the bumper sensor 17 and the ultrasonic sensor 18, and when the output of the emergency signal ceases, restarts the drive motors 26 and 28 to thereby immediately restart the predetermined automatic travel of the unmanned vehicle 1.

When the entrance mark 8 is detected, the program proceeds to step 103 and the CPU 22 disables the detection of signals output by the ultrasonic sensor 18, but maintains the detection of signals output by the bumper sensor 17.

The program then proceeds to step 104 and the CPU 22 determines whether or not the bumper sensor 17 has detected an obstacle such as an operator M, due to a contact between the obstacle and the bumper sensor 17, and has output an emergency stop signal. If the bumper sensor 17 does not detect an obstacle the program continues the automatic travel control, but if the bumper sensor 17 detects an obstacle by coming into contact therewith, the program proceeds to step 105 and an emergency stop of the unmanned vehicle 1 is made by immediately stopping the drive motors 26 and 28.

The program then proceeds to step 106, to commence to count the time for which the unmanned vehicle 1 is stopped, by the timer 22a, and then to step 107 at which the CPU 22 again determines whether or not the bumper sensor 17 has detected an obstacle. The result at step 107 in that cycle will be YES (refer to step 104), and the program then starts from step 105 in the next cycle and repeatedly counts up the stopped time until the result of step 107 becomes NO, i.e., until contact between the obstacle and the bumper sensor 17 is removed and the output of the emergency stop signal from the bumper sensor 17 ceases.

If a manually operated restart switch SW2 (FIGS. 2 and 4) is provided, it will be further determined whether or not a start signal is output from the restart switch, continuing to count the time even after the emergency signal from the bumper sensor 17 ceases. Then a start signal will be output from the restart switch.

The program then proceeds to step 108, to store the value of the stopped time counted by the timer 22a as a delay time caused by the stopping of the unmanned vehicle 1, in the RAM 24. Namely, the value of stopped time due to contact with the obstacle is stored as a delay time representing the time by which that unmanned vehicle 1 has been delayed, to recover the constant distance D between that unmanned vehicle 1 and the preceding unmanned vehicle 1.

The program then proceeds to step 109 and carries out an arithmetic calculation to recover the stored delay time, i.e., the program calculates based on the delay time, a recovery time for which the drive motors 26 and 28 must be rotated at a predetermined higher speed, to cause the unmanned vehicle 1 to reach a position at which the constant distance D is restored.

The program then proceeds to step 110 to control the travel of the unmanned vehicle 1 to recover the delay time by controlling the drive motors 26 and 28. Namely, the CPU 22 causes the drive motors 26 and 28 to start and rotate at a predetermined high speed, to cause the unmanned vehicle 1 to travel at the correspondingly high speed during the previously calculated recovery time, and to then decelerate to the initial low speed required while in the assembly area 5.

As explained above, according to the present invention, the detection of signal output by the ultrasonic sensor 18 acting as a non-contact type obstacle sensor is disabled when the unmanned vehicle 1 is travelling in the assembly area 5, in which operator's M frequently approach and move around the unmanned vehicle 1 to attach parts to workpiece W on the unmanned vehicle 1. Thus an emergency stop of the unmanned vehicle 1 is not carried out on the basis of a detection of signals output by the ultrasonic sensor 18, even if operators M frequently approach and move around the unmanned vehicle 1, and therefore, it is possible to achieve a smooth travel of the unmanned vehicle 1 and maintain, for example, the work cycle for the assembly of parts on the assembly area.

Also, in the illustrated embodiment, when the unmanned vehicle 1 is stopped by a detection of signals output by bumper sensor 17 in the assembly area 5, the CPU 22 counts the stopped time as a delay time until the unmanned vehicle 1 is restarted, and based on the delay time, controls the unmanned vehicle 1 to travel at a higher speed so that a constant distance D between that unmanned vehicle 1 and the preceding unmanned vehicle 1, is recovered. Therefore, it is possible to recover the required distance between the unmanned vehicles 1 and to prevent the occurrence of irregular intervals between unmanned vehicles 1 when an emergency stop of an unmanned vehicle 1 is made. Accordingly, in a conveying system in which articles are conveyed at regular intervals, the unmanned vehicle 1 can work in a manner similar to a conveyor-belt conveying system, in that a smooth travel of the unmanned vehicle 1 is always maintained.

The present invention is not restricted to the illustrated embodiment, but can be further modified within the scope of the present claims by appropriately altering a part of the arrangement, for example, as follows:

(a) In the illustrated embodiment, the unmanned vehicle 1 is stopped by the output of an obstacle detection signal from the bumper sensor 17 and automatically restarted when the output of the obstacle detection signal ceases, but it is possible to provide a manual switch SW2 (FIGS. 2 and 4) on the body 11 of the unmanned vehicle 1, by which the unmanned vehicle 1 can be restarted after it has been stopped.

(b) In the illustrated embodiment, the assembly area 5 is specified as a specific area in which a detection of signals output by the ultrasonic sensor 18 is disabled, and the unmanned vehicle 1 is restarted at a higher speed to recover a delay time incurred when the unmanned vehicle 1 is stopped, but it is possible to specify a parts loading area in which operators load parts other than the workpiece W onto the unmanned vehicle 1 as a specific area in which a detection of signals output by the ultrasonic sensor 18 is disabled and the unmanned vehicle 1 is restarted at a higher speed to recover a delay time incurred when the unmanned vehicle 1 is stopped.

(c) In the illustrated embodiment, the area indicating means comprises entrance and exit marks consisting of steel plate pieces 10 and the cooperating area detecting means comprises mark sensors 15, but it is possible to provide light emitting diodes in the specific area at an entrance and an exit thereof as an area indicating means, and to provide an optical sensor detecting light emitted from the diodes on the unmanned vehicle 1 as the area detecting means.

As explained above, according to the first aspect of the present invention, it is possible to avoid a stopping of the unmanned vehicle based on the detection of signals output by the non-contact type obstacle sensor in the specific area along the travel path of the unmanned vehicle, and thus achieve a smooth travel of the unmanned vehicle in the specific area.

According to the second aspect of the present invention, when the unmanned vehicle is stopped in response to a detection of signals output by the obstacle sensor, it is possible to recover a delay time incurred by the stopping of the unmanned vehicle and to realize a conveying system by which articles are conveyed at regular intervals.

I claim:

1. A travel control system for an unmanned surface vehicle provided with steering means and driving means to enable said unmanned vehicle to automatically travel along a predetermined travel path, said travel control system comprising:
   guide means provided throughout said travel path and cooperating with said steering means to guide said unmanned vehicle along said travel path;
   at least one non-contact type obstacle sensor and at least one contact type obstacle sensor arranged on said unmanned vehicle for detecting an obstacle in front of said unmanned vehicle while travelling along said travel path;
   first control means for controlling said driving means to cause said unmanned vehicle to stop when an obstacle is detected by at least one of said obstacle sensors;
   area boundary indicating means arranged in said travel path for defining a predetermined working area along said travel path;
   detecting means arranged in said unmanned vehicle for detecting signals indicative of said area boundary indicating means while said unmanned vehicle is travelling along said travel path to determine whether said unmanned vehicle is in one of within and outside of said predetermined working area;
   second control means responsive to signals from said detecting means for controlling detection of signals from said obstacle sensors so that detection of signals from said at least one non-contact type obstacle sensor is disabled when said unmanned vehicle is travelling within said predetermined working area and detection of signals from both of said types of obstacle sensors are enabled when said unmanned vehicle is travelling outside said predetermined working area.

2. A travel control system according to claim 1, wherein said first control means includes restart control means for restarting said unmanned vehicle in response to a restart signal after an obstacle is detected and said unmanned vehicle is stopped.

3. A travel control system according to claim 2, wherein said restart signal is output when an obstacle detection signal ceases after an obstacle is detected and said unmanned vehicle is stopped.

4. A travel control system according to claim 2, wherein a manually operated restart switch is provided for outputting a restart signal for restarting said unmanned vehicle after said unmanned vehicle is stopped in response to an output of an obstacle detection signal from said contact type obstacle sensor.

5. A travel control system according to claim 1, wherein said steering means and said driving means comprise a pair of steering and driving wheels arranged on an axis perpendicular to the longitudinal axis of said unmanned vehicle and a pair of electric motors connected, respectively, to each of said steering and driving wheels for independently driving said steering and driving wheels.

6. A travel control system according to claim 5, wherein said guide means comprises a conductive wire having a low frequency alternating current flowing therethrough and a position sensor arranged on said unmanned vehicle adjacent the underside thereof and on a line generally parallel to said travel path which line extends between said steering driving wheels, said position sensor having a pickup coil sensitive to the alternating current flowing in said guide means and able to output a steering control signal in accordance therewith.

7. A travel control system according to claim 1, wherein said at least one non-contact type obstacle sensor comprises an ultrasonic sensor and said at least one contact type obstacle sensor comprises a contact bumper arranged at the front of said unmanned vehicle operatively coupled to a switch.

8. A travel control system according to claim 1, wherein said area boundary indicating means comprises a first mark at an entrance to and a second mark at an exit from said predetermined working area.

9. A travel control system according to claim 8, wherein said first mark and said second mark are different.

10. A travel control system according to claim 8, wherein each of said first mark and said second mark is formed from a plurality of mark components arranged in a predetermined pattern.

11. A travel control system according to claim 10, wherein said predetermined patterns of said first mark and said second mark are different.

12. A travel control system according to claim 10, wherein said detecting means comprises a plurality of proximity sensors arranged in a predetermined pattern, whereby said detecting means is able to read the pattern of said first mark and said second mark.

13. A travel control system according to claim 12, wherein said predetermined pattern of said detecting means is the composite resultant of superimposing the patterns of said first mark and said second mark.

14. A travel control system according to claim 1, wherein said travel path is a closed loop path, and said unmanned vehicle travels therealong in one direction only.

15. A travel control system according to claim 1, wherein said travel path includes a work loading station, at least one assembly station, and an unloading station, and said predetermined working area includes said at least one assembly station.

16. A travel control system according to claim 1, wherein said first control means for controlling said driving means causes said unmanned vehicle to travel at a first speed when said unmanned vehicle is outside said predetermined working area and at a second speed lower than said first speed when said unmanned vehicle is within said predetermined working area.

17. A travel control system for an unmanned surface vehicle provided with steering means and driving means to enable said unmanned vehicle to automatically travel along a predetermined travel path, said travel control system comprising:
    guide means provided throughout said travel path and cooperating with said steering means to guide said unmanned vehicle along said travel path;
    at least one non-contact type obstacle sensor and at least one contact type obstacle sensor arranged on said unmanned vehicle for detecting an obstacle in front of said unmanned vehicle while travelling along said travel path;
    first control means for controlling said driving means to cause said unmanned vehicle to stop when an obstacle is detected by at least one of said obstacle sensors;
    area boundary indicating means arranged in said travel path for defining a predetermined working area along said travel path;
    detecting means arranged in said unmanned vehicle for detecting signals indicative of said area boundary indicating means while said unmanned vehicle is travelling along said travel path to determine whether said unmanned vehicle is in one of inside and outside of said predetermined working area;
    second control means responsive to signals from said detecting means for controlling detection of signals from said obstacle sensors so that detection of signals from said at least one non-contact type obstacle sensor is disabled when said unmanned vehicle is travelling within said predetermined working area and detection of signals from both of said types of obstacle sensors are enabled when said unmanned vehicle is travelling outside said predetermined working area, said first control means for controlling said driving means causing said unmanned vehicle to travel at a first speed when said unmanned vehicle is outside said predetermined working area and at a second speed lower than said first speed when said unmanned vehicle is inside said predetermined working area; and
    timing means for determining a time from when said unmanned vehicle is stopped in said predetermined working area to a time when said unmanned vehicle is restarted providing a time delay, said first control means including speed control means for causing said unmanned vehicle to travel at a third speed higher than said second speed when said unmanned vehicle is restarted to recover the time delay incurred by stopping of said unmanned vehicle and determined by said timing means.

18. A travel control system for an unmanned surface vehicle provided with steering means and driving means to enable said unmanned vehicle to automatically travel along a predetermined travel path, said travel control system comprising:
    guide means provided throughout said travel path and cooperating with said steering means to guide said unmanned vehicle along said travel path;
    at least one obstacle sensor arranged on said unmanned vehicle for detecting an obstacle in front of said unmanned vehicle while travelling along said travel path;
    control means for controlling said driving means to cause said unmanned vehicle to stop when an obstacle is detected by said at least one obstacle sensor and to thereafter restart;
    timing means for determining a time from when said unmanned vehicle is stopped to a time when said unmanned vehicle is restarted providing a time delay; and
    said control means including speed control means for causing said unmanned vehicle to travel at a speed higher than a previous speed at which said unmanned vehicle was travelling before being stopped, to recover the time delay incurred by stopping of said unmanned vehicle and determined by said timing means, when said unmanned vehicle is restarted.

19. A travel control system according to claim 18, wherein said control means includes restart control means for restarting said unmanned vehicle in response to a restart signal after an obstacle is detected and said unmanned vehicle is stopped.

20. A travel control system according to claim 19, wherein said restart signal is output when an obstacle detection signal ceases after an obstacle is detected and said unmanned vehicle is stopped.

21. A travel control system according to claim 19, wherein a manually operated restart switch is provided for outputting a restart signal for restarting said unmanned vehicle after said unmanned vehicle is stopped in response to an output of an obstacle detection signal from said contact type obstacle sensor.

* * * * *